No. 876,585. PATENTED JAN. 14, 1908.
S. F. PHILLIPS.
WHEEL FOR WHEELBARROWS.
APPLICATION FILED JUNE 8, 1907.
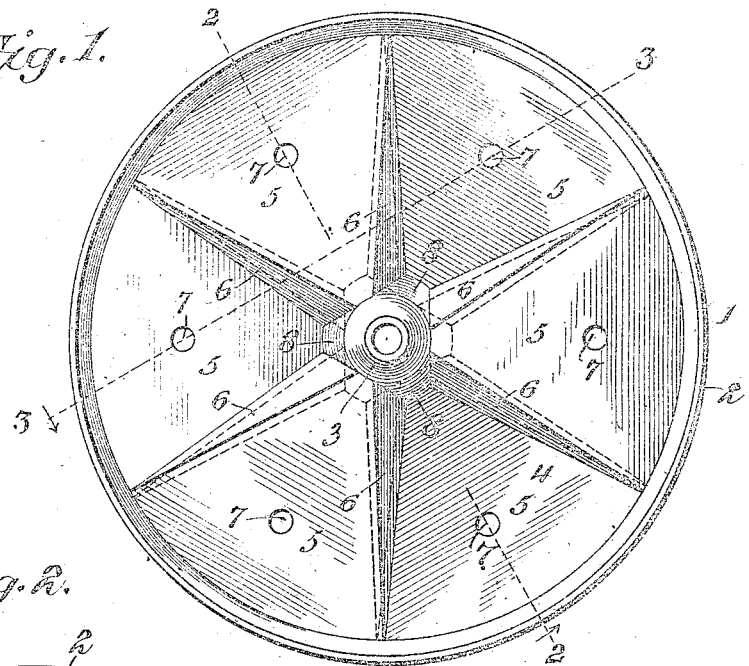
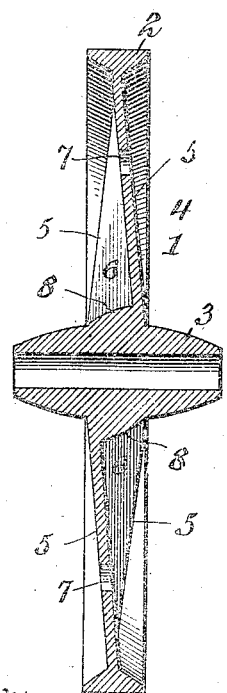
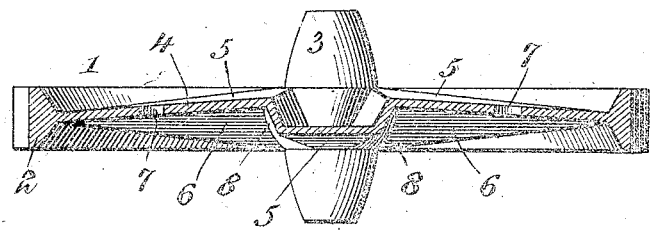
Witnesses
Howard D. Orr
H. F. Riley
S. F. Phillips, Inventor,
By
Attorney

UNITED STATES PATENT OFFICE.

SAMUEL FRANKLIN PHILLIPS, OF ASHBORO, NORTH CAROLINA.

WHEEL FOR WHEELBARROWS.

No. 876,585.

Specification of Letters Patent.

Patented Jan. 14, 1908.

Application filed June 8, 1907. Serial No. 377,974.

*To all whom it may concern:*

Be it known that I, SAMUEL FRANKLIN PHILLIPS, a citizen of the United States, residing at Ashboro, in the county of Randolph and State of North Carolina, have invented a new and useful Wheel for Wheelbarrows, of which the following is a specification.

The invention relates to improvements in wheels for wheelbarrows, etc.

The object of the present invention is to improve the construction of wheels, and to provide a simple and comparatively inexpensive single plate metallic wheel, which will be light, strong and durable and easily constructed.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side eelvation of a metallic wheel, constructed in accordance with this invention. Fig. 2 is a sectional view on the line 2—2 of Fig. 1. Fig. 3 is a similar view on the line 3—3 of Fig. 1.

Like numerals of reference designate corresponding parts in all the figures of the drawing.

1 designates a solid cast metal wheel, designed for use on wheelbarrows and consisting of a rim 2, a hub 3 and a single connecting plate 4, formed integral with the rim and the hub of the wheel. The plate of the wheel consists of an annular series of inwardly tapered sector-shaped portions 5, arranged in staggered relation and extending from the hub to the rim and bounded by straight side edges and curved outer edges, the adjacent side edges of the tapered portions being arranged in planes, which converge from the hub of the wheel to the rim of the same.

The sector-shaped portions 5 are connected with each other by means of radially arranged webs 6, formed integral with the sector-shaped portions and tapered from the hub to the rim. These webs are set at an angle, and the sector-shaped portions and the webs form depressions or recesses, which are alternately arranged at opposite faces of the plate and the webs at opposite sides of each recess are arranged at obtuse angles to the sector-shaped portion constituting the back of the recesses. By this construction, a light wheel of great strength and durability is provided, but the lightness of the wheel may be increased by openings 7, formed in the sector-shaped portions 5.

The rim of the wheel is tapered or approximately triangular in cross section, and the sector-shaped portions are united with the rim in a plane coincident with the median line thereof. The hub, which is tapered from the center towards each end, is provided with central tapered portions 8, located at the inner ends of the recesses or depressions and presenting inclined faces, which extend from the webs towards the center of the wheel.

As the wheel consists of a single solid casting, there are no welded or riveted parts to become loose, and any number of wheels may be constructed straight, true and exactly alike, which will adapt the wheel for various uses. Also the particular construction of the plate of the wheel enables a wheel of great strength and durability to be constructed of cheap material and with little labor.

Having thus fully described my invention, what I claim as new and desire to secure by Letters Patent, is:—

1. A metallic wheel comprising a hub, a rim, and a single plate connecting the hub and the rim and formed integral with the same and consisting of an annular series of inwardly tapered substantially sector-shaped portions arranged in staggered relation and extending from the hub to the rim and having their outer portions united with the latter in a plane coincident with the median line of the rim, and radial web portions connecting the sector-shaped portions and tapered outwardly from the hub to the rim.

2. A metallic wheel comprising a hub, a rim, and a single plate connecting the hub and the rim and formed integral with the same and consisting of an annular series of inwardly tapered substantially sector-shaped portions arranged in staggered relation and extending from the hub to the rim and having their outer portions united with the latter in a plane coincident with the median line of the rim, and radial web portions connecting the sector-shaped portions and tapered outwardly from the hub to the rim, said web portions forming depressions or recesses located alternately at opposite faces of the plate of the wheel.

3. A metallic wheel comprising a hub, a rim, and a single plate connecting the hub and the rim and formed integral with the same and consisting of an annular series of inwardly tapered substantially sector-shaped portions arranged in staggered relation and extending from the hub to the rim and having their outer portions united with the latter in a plane coincident with the median line of the rim, and radial web portions connecting the sector-shaped portions and tapered outwardly from the hub to the rim, said web portions forming depressions or recesses located alternately at opposite faces of the plate of the wheel, and the web portions at each recess being arranged at an obtuse angle to the sector-shaped plate forming the back of the recess.

In testimony, that I claim the foregoing as my own, I have hereto affixed my signature in the presence of two witnesses.

SAMUEL FRANKLIN PHILLIPS.

Witnesses:
C. E. BROWN,
G. P. SNIDER.